United States Patent [19]

Dockery et al.

[11] 4,142,760
[45] Mar. 6, 1979

[54] VEHICLE COVER WITH HOLD DOWN MEANS

[76] Inventors: Denzel J. Dockery; Devan T. Dockery, both of P.O. Box 7048, Flint, Mich. 48507; Rex G. Carlson, Rte. 2, Box 882, Mio, Mich. 48647

[21] Appl. No.: 836,532

[22] Filed: Sep. 26, 1977

[51] Int. Cl.$^2$ .............................................. B60J 7/10
[52] U.S. Cl. .............................................. 296/137 B
[58] Field of Search ............... 296/137 B, 137 R, 100, 296/23 MC; 280/179 R

[56] References Cited

U.S. PATENT DOCUMENTS

| | | | |
|---|---|---|---|
| 2,886,375 | 5/1959 | Crawford | 296/100 |
| 3,180,674 | 4/1965 | Pounds | 296/100 |
| 3,704,039 | 11/1972 | Dean | 296/137 B |
| 3,762,763 | 10/1973 | Deshoras | 296/137 B |
| 4,079,989 | 3/1978 | Robertson | 296/137 B |

Primary Examiner—Joseph F. Peters, Jr.
Assistant Examiner—Gene A. Church
Attorney, Agent, or Firm—Gifford, Chandler, Van Ophem, Sheridan & Sprinkle

[57] ABSTRACT

A cover with novel hold down means is provided for a vehicle having an open bed, such as a pickup truck, for covering and enclosing the vehicle bed. The cover is constructed of a rigid or semirigid material and is hinged to one sidewall of the vehicle bed so that the cover can pivot upwardly from the other sidewall of the vehicle bed to permit access into the interior of the bed. In addition the novel hold down means comprises an elongated member which threadably engages a V-shaped member and both of which are inserted into a stake hole on the vehicle bed. Rotation of the member moves the V-shaped member upwardly to clampingly engage the interior of the vehicle sidewall.

10 Claims, 6 Drawing Figures

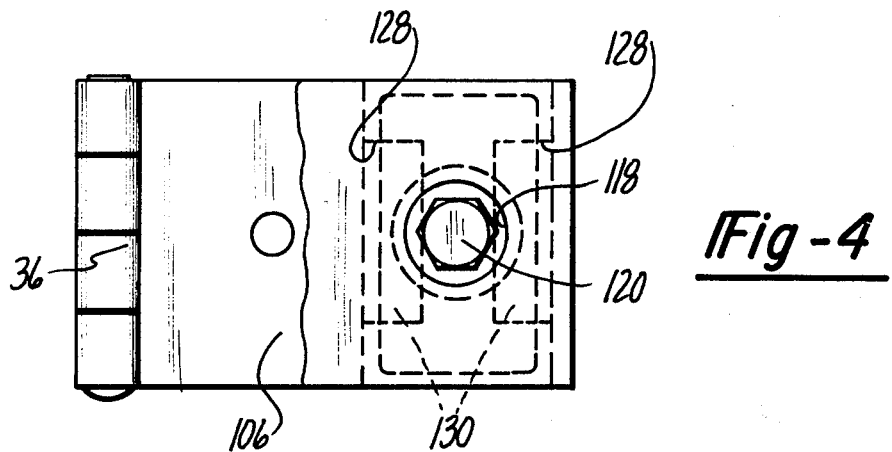
*Fig-4*
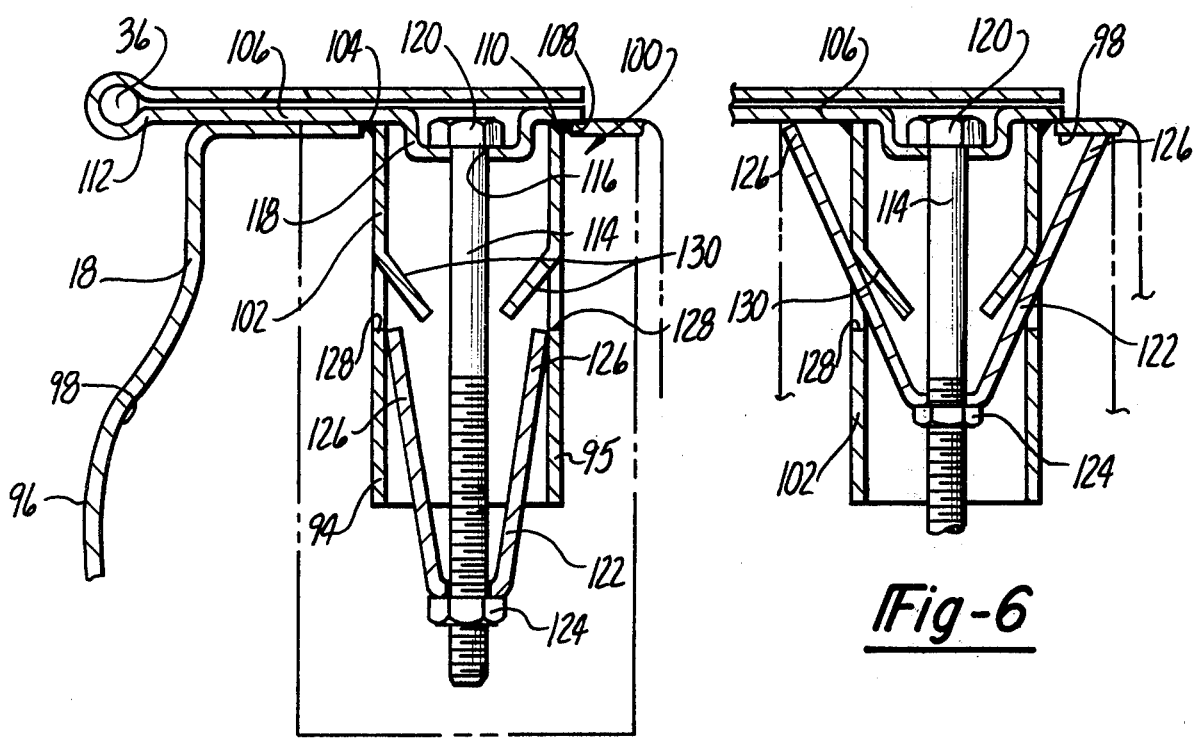
*Fig-5*   *Fig-6*

VEHICLE COVER WITH HOLD DOWN MEANS

BACKGROUND OF THE INVENTION

I. Field of the Invention

The present invention relates to a cover with novel hold down means and pivotally mounted to an open bed of a vehicle.

II. Description of the Prior Art

Vehicles with open beds, for example pickup trucks, have enjoyed widespread acceptance due primarily to their convenience for carrying relatively large articles. The open bed of the vehicle commonly includes a pair of upwardly extending sidewalls while the backwall of the passenger cabin forms the frontwall of the bed. A rear hitch or gate also forms the backwall of the bed. The relatively large bed permits relatively large articles to be transported by the vehicle which could not otherwise be transported in a passenger car.

One disadvantage of such vehicles, however, is that the bed is open which exposes the contents of the bed, if any, to rain, snow and the like which may damage the contents of the bed. Moreover, the open bed displays the contents contained therein and virtually invites the theft of valuable articles being carried by the vehicle.

One previously known method of protecting the contents of the bed from the elements and possible theft has been to cover the bed with a tarp. Typically, the tarp is lashed or tied down to both sidewalls of the bed by strings, cords or the like. The disadvantage of these previously known tarps, however, is that both securing the tarp across the vehicle bed and opening the same is a lengthy and time consuming process thus precluding easy access to the interior of the bed.

A still further type of cover for the vehicle bed that has been previously known is a semirigid cover, typically constructed of fiber glass, and having downwardly extending portions which are received in the four corners of the vehicle bed. With the fiberglass cover placed over and in the vehicle bed, the downwardly extending portions secure the cover to the vehicle bed. The disadvantage of this type of previously known cover is that the cover must be lifted into and out from the bed in order to respectively gain access to and enclose the vehicle bed. However, these previously known covers are relatively heavy in construction and require two or more persons to manipulate them. Moreover, even when a sufficient number of persons are available to manipulate the cover, the cover is nevertheless awkward and time consuming in both its placement on the vehicle bed and in its removal therefrom.

In still further vehicle covers, hold down means are inserted into the stake holes in the sidewalls of the vehicle bed in order to secure the cover to the bed. These previously known hold down means, however, are complicated and expensive in construction and often include means for clamping against the exterior of the bed sidewalls in order to secure the cover. Moreover, many of these previously known hold down means require the drilling of holes and other modifications to the vehicle which adversely affects the resale value of the vehicle.

SUMMARY OF THE PRESENT INVENTION

The present invention overcomes these previously known problems of vehicle bed covers by providing a simple, inexpensive and easily manipulated cover for a vehicle bed with a novel hold down means.

In brief the present invention comprises a generally rectangular cover, preferably constructed of rigid or semirigid material such as fiberglass and dimensioned to fit across the top of the vehicle bed. Unlike the previously known vehicle bed covers, one side of the cover is hinged or pivotally secured to one sidewall of the vehicle bed by the hold down means which will be subsequently described. Thus, the other side of the cover can pivot upwardly around an axis substantially parallel to the longitudinal axis of the vehicle in order to permit access into the interior of the vehicle bed.

A strut is also preferably provided and movable to a position between the vehicle and the cover when the cover is in its open position. The strut supports and maintains the vehicle cover in its open position until closure of the cover is required. In addition, locking means are preferably provided between the cover and one sidewall of the vehicle bed to lock the cover in its lower or closed position in order to prevent unauthorized entry into the vehicle bed.

As will hereinafter become more readily apparent as the description proceeds, the cover according to the present invention can be easily and rapidly opened and closed by a single person due to the hinged attaching means between one side of the cover and one sidewall of the vehicle bed.

The present invention also provides a novel hold down means for attaching the pivotally connected side of the cover to the vehicle. In brief, the hold down means comprises a housing vertically insertable into a stake hole in the vehicle bed sidewall. An elongated bolt is rotatably carried by the housing and threadably engages the apex of a V-shaped member at its lower end. Rotation of the bolt draws the V-shaped member upwardly whereby the free ends of the V-shaped member move upwardly and outwardly through slots formed in the sides of the housing and clampingly engage the interior of the vehicle sidewall. As will subsequently become more clearly apparent, the hold down means of the present invention is simple and inexpensive in construction and yet effective in operation.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 4 is a top plan view illustrating the novel hold down means of the present invention and enlarged for clarity;

FIG. 5 is a side sectional view of the hold down means of the present invention attached to the vehicle and enlarged for clarity; and FIG. 6 is a sectional view similar to FIG. 5 but showing the hold down means in a clamping position.

DETAILED DESCRIPTION OF THE PRESENT INVENTION

Figure 1:
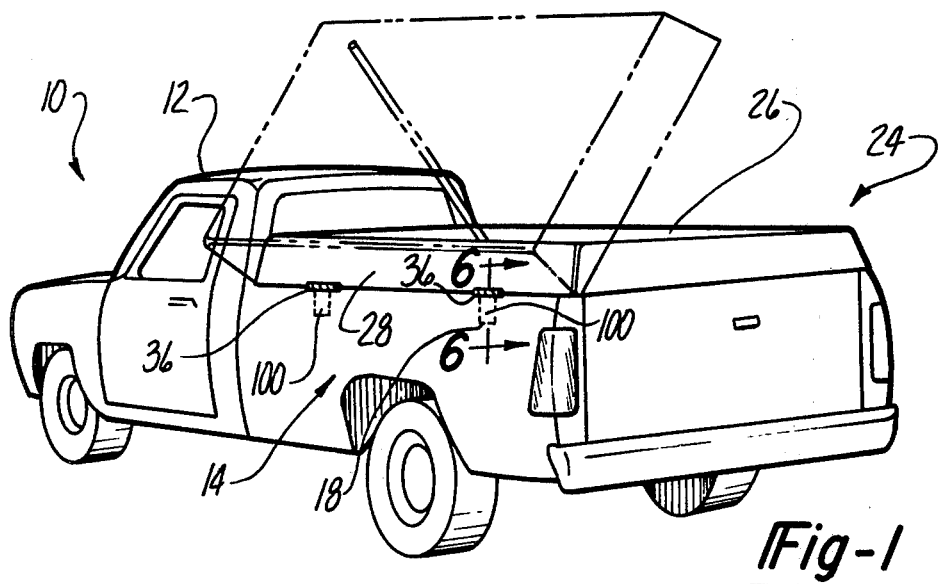
FIG. 1 is a rear perspective view illustrating the cover of the present invention secured onto a vehicle.
Figure 2:
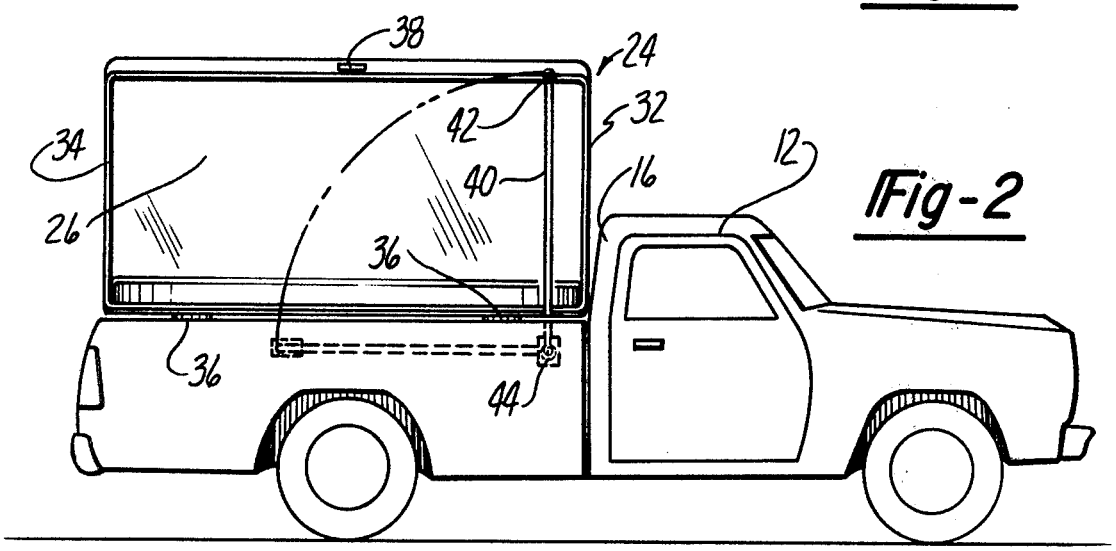
FIG. 2 is a side view showing the cover according to the present invention secured to a vehicle and in its open position.
Figure 3:
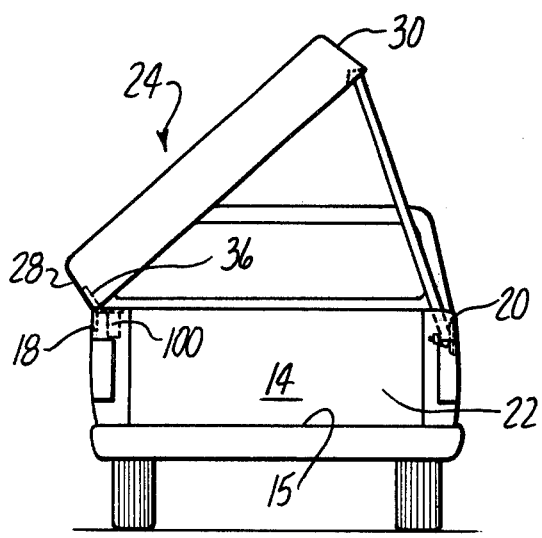
FIG. 3 is a rear plan view illustrating the cover of the present invention secured onto a vehicle and in its open position.

With reference first to FIGS. 1-3, a vehicle 10 is thereshown having a passenger compartment 12 and a bed 14 behind the passenger compartment 12 and which is open on its top. The vehicle bed 14 further includes a frontwall 16 formed by the rear of the passenger compartment 12, a pair of spaced and parallel sidewalls 18 and 20 and a backwall or gate 22. The two sidewalls 18 and 20 and the backwall 22 extend upwardly from the base 15 of the bed 14 and form a generally rectangular carrying chamber above the bed 14.

A cover 24 according to the present invention includes a generally rectangular top 26 substantially the same size as the bed 14. In addition, sidewalls 28 and 30, a frontwall 32 and a backwall 34 extend downwardly from the outer periphery of the top 26 a predetermined and substantially equal amount with the walls 28, 30, 32 and 34 joined together at each corner.

The cover 24 can be constructed of any suitable material, but preferably is made of a rigid or semirigid material such as a one-piece fiberglass construction. The cover 24, however, can be made of other materials while remaining within the scope and intent of the instant invention.

One sidewall 28 of the cover 24 is pivotally secured by hinges 36 each of which in turn is secured by a hold down means 100 to one sidewall 18 of the truck bed. The hinges 36 permit the cover 24 to pivot upwardly from the other sidewall 20 of the truck bed 14 about an axis substantially parallel to the longitudinal axis of the vehicle 10 to the position illustrated in phantom line in FIG. 1. With the cover 24 in its open position, the interior of the bed 14 is accessible over the sidewall 20 of the truck bed 14 and over the backwall 22 of the truck bed 14.

Conversely, the cover 24 can be lowered down on top of the truck bed 14 to the position shown in solid line in FIG. 1 in which the cover sidewalls 28 and 30 register with and abut against the top of the truck bed sidewalls 18 and 20, respectively, while the cover backwall 34 registers with and abuts against the top of the truck backwall 22. With the cover 24 in its lower most position, appropriate lock means 38 (FIG. 2) on the cover sidewall 30 are provided to lock the cover 24 in its lower or closed position and thus prevent unauthorized entry into the interior of the bed 14.

With reference now particularly to FIGS. 2 and 3, a strut 40 is included which can be positioned between an upper stop member 42 on the cover sidewall 30 and a lower stop member 44 on the vehicle sidewall 20 in order to support and maintain the cover 24 in its open position. Moreover, the strut 40 is preferably pivotally connected at one end to either the stop member 42 or 44 so that the strut 40 can be moved to a storage position either along the cover sidewall 30 or the vehicle sidewall 20. For example, the strut 40 is illustrated in a storage position in phantom line in FIG. 2 along the vehicle sidewall 20.

By pivotally connecting one sidewall 28 of the cover 24 to one vehicle sidewall 18, the cover 24 can be easily and rapidly moved by a single operator between an open and closed position. Moreover, once opened, the cover 24 permits easy access into the entire interior of the truck bed 14.

With reference now to FIGS. 4-6, the hold down means 100 for securing the cover hinge 36 to the vehicle sidewall 18 is thereshown in greater detail. It will be understood, however, that the hold down means 100 can be employed for securing devices other than the vehicle cover 24, for example a camper body, to the vehicle sidewall 18 and 20 while remaining within the scope of the invention.

The hold down means 100 includes a rectangular and tubular housing 102 which is vertically insertable into a stake hole 104 commonly formed through the top of the vehicle bed sidewall 18. Moreover, the sidewall 18 is a thin walled structure having an exterior surface 96 and an interior surface 98. A top plate 106 is secured by welds 108 perpendicularly across the upper end 110 of the housing 102 so that the bottom of the plate 106 abuts against the top of the vehicle sidewall 18. The plate 106 is connected to and forms a part of the hinge 36 at one end 112.

An elongated threaded member 114, such as a bolt, extends downwardly coaxially through the interior of the housing 102 via an aperture 116 formed through a depression 118 in the plate 106. The threaded member 114 has an upper enlarged head 120 greater in area than the aperture 116 so that the head 120 is retained within the plate depression 118.

With reference now particularly to FIGS. 4 and 5, a V-shaped member 122 is contained within the interior of the housing 102 and threadably secured by a nut 124 to the lower end of the threaded member 114. The free ends 126 of the V-shaped member 122 register with slots 128 in opposite sides 94 and 95 of the housing 102. An inclined portion 130, preferably stamped from the housing 102, extends inwardly from the upper edge of each slot 128 for a purpose to be shortly described.

In operation, in order to attach the hold down means 100 to the vehicle sidewall 18, the housing 102 with the free ends 126 of the V-shaped member 122 below the slots 128 (FIG. 5) is inserted into the stake hole 104 so that the plate 106 abuts against the upper exterior surface 96 of the vehicle sidewall 18. Thereafter, rotation of the threaded member 114 draws the V-shaped member upwardly through the housing 102 so that the free ends 126 of the V-shaped member 122 are deflected outwardly through the slots 128 by the inclined portions 130. Further rotation of the threaded member 114 causes the free end 126 of the V-shaped member 122 to move to the position shown in FIG. 6 and abut against the interior surface 98 of the sidewall 18. Further rotation of the threaded member 114 clampingly engages the sidewall 18 between the plate 106 and the V-shaped member 122 thereby firmly securing the cover 24 to the vehicle 10.

It can therefore be seen that the hold down means 100 of the present invention provides a simple, inexpensive and yet effective means for securing the cover 24 or the like to the vehicle bed 14.

Having described my invention, however, many modifications thereto will become apparent to those skilled in the art to which it pertains without deviation from the spirit of the invention as defined by the scope of the appended claims.

I claim:

1. For use with a vehicle having an open bed, two sidewalls, a frontwall and a backwall, at least one sidewall having an interior surface and exterior surface and a stake hole formed through the sidewall, a device comprising a substantially rigid cover, said cover being dimensioned to substantially enclose said open bed of said vehicle, hinge means secured to said cover, and hold down means for securing said hinge means to one of said bed sidewalls whereby said hinge means permit said cover to pivot upwardly from the other bed sidewall about an axis substantially parallel to the longitudinal axis of the vehicle to provide access to the interior of said bed, wherein said hold down means further comprises a tubular housing insertable into the stake hold having at least one side opening and inclined deflection means secured along the upper edge of the opening, a clamping means comprising a member having a free end in registration with said housing opening and means accessible exteriorly of the housing for selectively moving said clamping means between a first position in which the free end of said member is substantially contained within the interior of the housing, and a second position in which the free end of the member abuts against the inclined deflection means to extend outwardly through the housing opening and abut against the interior of the truck bed sidewall.

2. The invention as defined in claim 1 and further including strut means for maintaining said cover in an open position.

3. The invention as defined in claim 2 wherein said strut means is pivotally secured at one end and movable between a storage and a supporting position.

4. The invention as defined in claim 1 and including means for locking said cover in its closed position.

5. For use with a vehicle having an open bed, said bed having at least one sidewall, said sidewall having an interior and exterior surface and a stake hole formed through the sidewall, a device for securing a body to said sidewall comprising, a housing insertable into the stake hole, an abutment means secured to the housing and adapted to abut against the exterior surface of said sidewall when said housing is inserted into the stake hole, clamping means carried by the housing and movable between a non-clamping position and a clamping position in which the clamping means engages the interior surface of the sidewall, and means accessible exteriorly of the housing for selectively moving said clamping means between said non-clamping and said clamping positions, wherein said housing is tubular and includes at least one side opening and inclined deflection means secured along the upper edge of the opening, and wherein said clamping means further comprises a member having a free end in registration with said housing side opening, and wherein said moving means is operable to move the free end of said member from the non-clamping position in which the free end of the member is substantially contained within the interior of the housing, to the clamping position in which the free end of the member abuts against the inclined deflection means to extend outwardly through the housing opening and abut against the interior of the truck bed sidewall.

6. The invention as defined in claim 5 in which the housing and the deflection means are of one-piece construction.

7. The invention as defined in claim 5 wherein said housing has at least two side openings and wherein said member is V-shaped having two upper free ends, each free end being in registration with one housing opening.

8. The invention as defined in claim 5 wherein said moving means further comprises an elongated threaded member axially constrained to said housing, said threaded member having one end accessible exteriorly of the housing and a threaded end threadably engaging said clamping means.

9. The invention as defined in claim 5 wherein said moving means is an elongated threaded member axially constrained to said housing having one end exteriorly accessible of said housing and its other end threadably engaging said clamping means member.

10. The invention as defined in claim 7 wherein said moving means further comprises an elongated threaded member axially constrained to said housing, having one end accessible exteriorly of said housing and the other end extending through and threadably engaging the apex of the V-shaped member.

* * * * *